(12) United States Patent
Li (10) Patent No.: US 9,155,112 B2
(45) Date of Patent: Oct. 6, 2015

(54) METHOD AND SYSTEM FOR QUERYING GROUP'S DISPATCHING AREA INFORMATION

(75) Inventor: Huijuan Li, Guangdong (CN)

(73) Assignee: ZTE CORPORATION, Shen Zhen, Guang Dong Province (CN)

(*) Notice: Subject to any disclaimer, the term of this patent is extended or adjusted under 35 U.S.C. 154(b) by 308 days.

(21) Appl. No.: 13/643,608

(22) PCT Filed: Oct. 19, 2010

(86) PCT No.: PCT/CN2010/077859
§ 371 (c)(1),
(2), (4) Date: Oct. 26, 2012

(87) PCT Pub. No.: WO2011/134244
PCT Pub. Date: Mar. 11, 2011

(65) Prior Publication Data
US 2013/0045769 A1  Feb. 21, 2013

(30) Foreign Application Priority Data

Apr. 28, 2010  (CN) .......................... 2010 1 0159875

(51) Int. Cl.
| H04B 7/00 | (2006.01) |
| H04W 76/00 | (2009.01) |
| H04W 4/02 | (2009.01) |
| H04W 4/08 | (2009.01) |
| H04W 4/10 | (2009.01) |

(52) U.S. Cl.
CPC .............. *H04W 76/005* (2013.01); *H04W 4/02* (2013.01); *H04W 4/08* (2013.01); *H04W 4/10* (2013.01)

(58) Field of Classification Search
CPC .................................... H04W 76/005
USPC ..................... 455/518, 404.1, 404.2
See application file for complete search history.

(56) References Cited

U.S. PATENT DOCUMENTS

| 6,721,747 | B2 * | 4/2004 | Lipkin | 709/209 |
| 8,504,009 | B2 * | 8/2013 | Wen et al. | 455/421 |
| 2006/0003784 | A1 * | 1/2006 | Chion et al. | 455/518 |
| 2006/0046759 | A1 | 3/2006 | Yoon et al. | |
| 2006/0159235 | A1 * | 7/2006 | Eisner et al. | 379/45 |

FOREIGN PATENT DOCUMENTS

| CN | 1897719 A | 1/2007 |
| CN | 101815255 A | 8/2010 |
| WO | WO 2006/032725 A1 | 3/2006 |

OTHER PUBLICATIONS

European Patent Office, European Patent Search Report issued on Feb. 12, 2014.

* cited by examiner

*Primary Examiner* — Sanh Phu
(74) *Attorney, Agent, or Firm* — Li&Cai Intellectual Property (USA) Office (57) ABSTRACT

The disclosure discloses a method for querying group's dispatching area information, which comprises: a user sending a request for querying group's dispatching area information to a base station through a user terminal; and the base station querying the group's dispatching area information according to request for querying the group's dispatching area information, and returning a response to the group's dispatching area information query to the user terminal. The disclosure also discloses a query system for the querying group's dispatching area information correspondingly. The present invention can improve the validity, the dispatching reliability and accuracy of the group call.

12 Claims, 6 Drawing Sheets

METHOD AND SYSTEM FOR QUERYING GROUP'S DISPATCHING AREA INFORMATION

FIELD OF THE INVENTION

The disclosure relates to a digital trunking communication field, in particular, to a method and a system for querying group's dispatching area information.

BACKGROUND OF THE INVENTION

Figure 1:
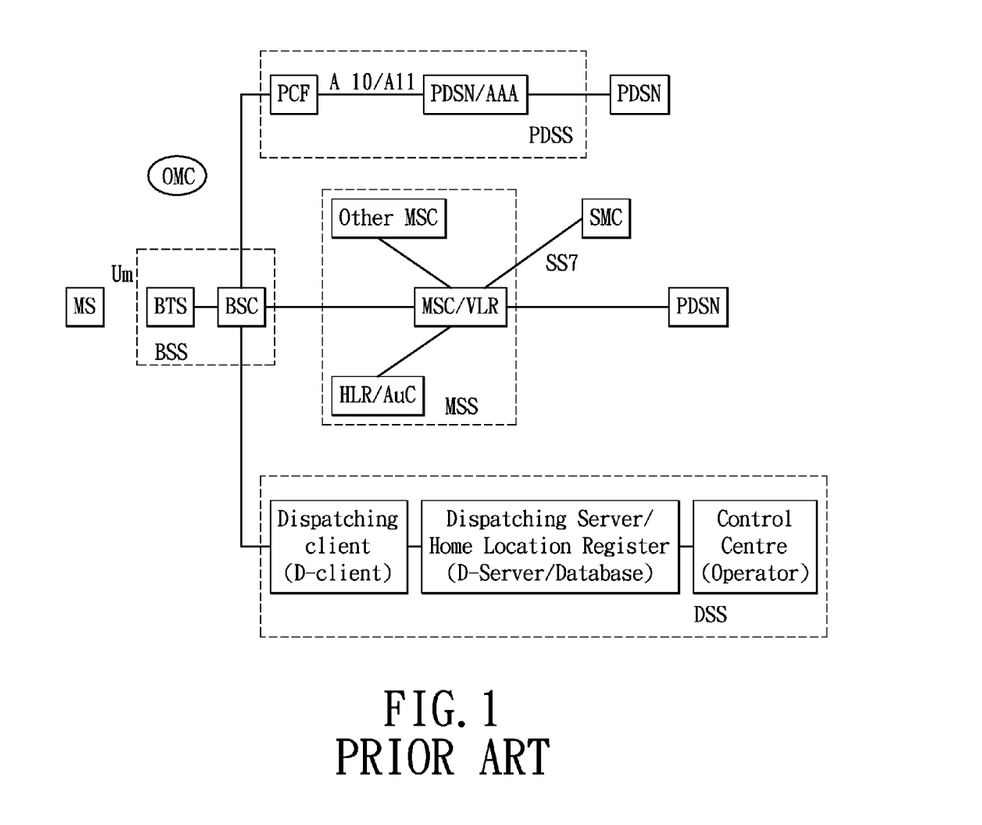
FIG. 1 shows a schematic diagram of a network structure of a trunking communication system.

Trunking communication is a special dispatching communication method, providing commanding and dispatching communication functions via a simplex communication mode. Trunking communication is widely applied to various fields, such as medical care and rescue, transportation, municipal administration, manufacturing and mining industries, public security, and military. Professional digital trunking communication based on the Code Division Multiple Access (CDMA) technology has the advantages of high rate of frequency utilization, wide coverage, great user capacity, clear sound, energy efficiency, environmental friendliness, high conversation confidentiality, among others. FIG. 1 shows a schematic diagram of a network structure of a trunking communication system. As shown in FIG. 1, the network structure of the trunking communication system is generally composed of a Mobile Station (MS), a Base Station Sub-System (BSS), a Mobile Switching Sub-system (MSS), a Dispatching Sub-System (DSS), a Packet Data Service Sub-system (PDSS) and an Operation and Maintenance Centre (OMC).

Trunking communication involves two concepts: group and dispatching area, wherein a group is a logic collection of certain number of group members, and a group call initiated from each member can be heard by all the group members. A dispatching area is defined by dividing the network coverage of a communication system, and the minimum unit of a dispatching area may be a cell of the base station. A dispatching area of a group may also include multiple cells. Based on the setting of the dispatching area, a trunking communication system generally allows two types of group calls: non-dispatching area group calls and dispatching area group calls. Relatively speaking, non-dispatching area group calls have no restrictions and are like regular group calls. Restrictions for dispatching area group calls include:

(1) a user outside the dispatching area cannot be called;
(2) a user outside the dispatching area can initiate a call; and
(3) a call will not be dropped when a user moves outside the dispatching area during the call process.

Normally, it may be required that a group member can only be called within a certain geographical region, namely, only users in this region can be called. Setting dispatching area can realize this purpose and has the following advantages:

(1) some special services require communications to be confidential and only certain people in certain regions can communicate;
(2) the utilization efficiency of the whole system resource is increased and the system capacity is also increased; and under the same conditions, non-dispatching area group calls will consume more system resource compared to dispatching area group calls given the same number of users; and
(3) a group member in the dispatching area can push to talk (PTT) to communicate with all other group members so that the call connection time is shortened.

Most of the group calls initiated by a trunking communication user terminal are dispatching area group calls. However, a user may not be able to get real-time information from its user terminal about which dispatching area a group belongs to and which groups can call the user. Conventional solution to this problem is to fix dispatching areas and dispatching purposes for certain groups, which have to be memorized by users. However, this method has the problems of low adaptability and low reliability, and in an urgent dispatching scene, the consequences of mal-operation cannot be underestimated.

SUMMARY OF THE INVENTION

In order to solve the above problems, the embodiments of the present invention provide a method and a system for querying a group's dispatching area information to enable a user to obtain the group's dispatching area information on real time, to therefore realize intelligent dispatching for group members and improve group call validity as well as the reliability and accuracy of the dispatching.

In order to realize the purpose, the technical solution according to the embodiments of the present invention discloses:

a method for querying group's dispatching area information comprising:

sending, by a user, a request for querying group's dispatching area information to a base station through a user terminal;

querying, by the base station, the group's dispatching area information according to the request for querying group's dispatching area information and returning a response to the group's dispatching area information query to the terminal.

The step of the sending, by the user, the request for querying group's dispatching area information to the base station through the user terminal comprises: sending, by the user, the request for querying the group's dispatching area information to the BSS through the user terminal; and the step of querying, by the base station, the group's dispatching area information according to the request for querying the group's dispatching area information and returning a response to the group's dispatching area information query to the user terminal comprises:

forwarding, by the BSS, the request for querying group's dispatching area information to a Dispatching Server (PDS), querying, by the PDS, the group's dispatching area information from a Home Location Register (PHR), and querying, by the PHR, corresponding group's dispatching area information and returning a response to the group's dispatching area information query to the user terminal.

Before the step of querying, by the PHR, corresponding group's dispatching area information, the method further comprises: authenticating, by the PHR, whether the user is a legitimate user according to the relevant information stored on the PHR, and querying corresponding group's dispatching area information after the authentication is successful.

The step of querying, by the PHR, corresponding group's dispatching area information and returning the group's dispatching area information to the user terminal comprises:

determining, by the PHR, whether the user has the query authority according to authority data stored on the PHR; and if the user has the query authority, calling out, by the PHR, the group's dispatching area information requested by the user and returning the group's dispatching area information to the PDS; and after the PDS forwarding the group's dispatching area information to the user terminal through the BSS, displaying, by the user terminal, a query result; and if the user has no query authority, returning a message, by the PHR, to the PDS indicating that a function for querying group's dispatching area information is not activated, and after the PDS forwarding the group's dispatching area message to the user terminal through the BSS, displaying, by the user terminal, that the function for querying group's dispatching area information is not activated.

The method further comprises: activating the function for querying group's dispatching area information, comprising:

sending, by the user, a request for activating the function for querying group's dispatching area information to the BSS through the user terminal;

forwarding, by the BSS, the request for activating the function for querying group's dispatching area information to the PDS;

notifying, by the PDS, the PHR of updating the authority data according to the request for activating the function for querying group's dispatching area information; and updating, by the PHR, the authority data and returns a response to the notification of updating authority data.

The method further comprises: disabling the function for querying group's dispatching area information, comprising:

sending, by the user, a request for disabling a function for querying group's dispatching area information to the BSS through the user terminal;

forwarding, by the BSS, the request for disabling the function for querying group's dispatching area information to the PDS;

notifying, by the PDS, the PHR of updating the authority data according to the request for disabling the function for querying group's dispatching area information; and updating, by the PHR, the authority data and returns the response to the notification of updating authority data.

The step of updating, by the PHR, the authority data and returning the response to the notification of updating the authority data comprises:

returning, by the PHR, operate-complete information to the PDS if content requested by the user is consistent with the authority data stored on the PHR, and after the PDS forwarding operate-complete information to the user terminal through the BSS, displaying, by the user terminal, the operation-complete information; and if the content requested by the user is inconsistent with the authority data stored on the PHR, updating, by the PHR, the corresponding authority data according to the user request and returning updating success message to the PDS, and after the PDS forwarding the updating success message to the user terminal through the BSS, displaying, by the user terminal, the updating success message.

A system for querying group's dispatching area information comprises a user terminal and a base station, wherein the user terminal is configured to send a request for querying group's dispatching area information to the base station according to the user operation; and the base station is configured to query the group's dispatching area information according to the request for querying group's dispatching area information from the user terminal, and return a response to the group's dispatching area information query to the user terminal.

The base station specifically comprises a BSS, a PDS and a PHR, wherein the BSS is configured to receive the request for querying group's dispatching area information from the user terminal and forward the request for querying the group's dispatching area information to the PDS;

the PDS is configured to query the group's dispatching area information according to the request for querying group's dispatching area information forwarded by the BSS; and the PHR is configured to query corresponding group's dispatching area information according to the query of the PDS and return the response to the group's dispatching area information to the user terminal.

The PHR is also configured to authenticate whether the user is a legitimate user according to the relevant information stored on the PHR, and if the authentication is successful, the PHR queries corresponding group's dispatching area information.

The step of querying, by the PHR, corresponding group's dispatching area information and returning the response to the group's dispatching area information query to the user terminal comprises:

the PHR determining whether the user has a query authority according to the authority data stored on the PHR; if the user has the query authority, the PHR calling out the group's dispatching area information requested by the user and returns the information to the PDS, and after the PDS forwards the information to the user terminal through the BSS, the user terminal displaying a query result; and if the user has no query authority, the PHR returning a message to the PDS indicating that a function for querying group's dispatching area information is not activated, after the PDS forwards the message to the user terminal through the BSS, the user terminal displaying that the function for querying group's dispatching area information is not activated.

The user terminal is further configured to send a request for activating the function for querying group's dispatching area information to the BSS according to the user operation.

The BSS is further configured to forward the request of activating the function for querying group's dispatching area information from the terminal to the PDS.

The PDS is further configured to notify the PHR of updating the authority data when receiving the request for activating the function for querying group's dispatching area information from the BSS.

The PHR is further configured to update the authority data after receiving the notification of updating authority data from the PDS and return a response to notification of updating the authority data.

The user terminal is further configured to send a request of disabling the function for querying group's dispatching area information to the BSS according to the user operation.

The BSS is further configured to forward the request of disabling the function for querying group's dispatching area information from the user terminal to the PDS.

The PDS is further configured to notify the PHR of updating the authority data when receiving the request for disabling the function for querying group's dispatching area information from the BSS.

The PHR is further configured to update the authority data after receiving the notification of updating authority data from the PDS and return a response to the notification of updating the authority data.

The step of the PHR updating the authority data and returning the response to the notification of updating the authority data comprises:

if content requested by the user is consistent with the authority data stored in the PHR, the PHR returning the operation-complete information to the PDS, and after the PDS forwards the information to the user terminal through the BSS, the user terminal displaying the operation-complete information; and if the content requested by the user is inconsistent with the authority data stored on the PHR, the PHR updating the corresponding authority data according to the user request and returning updating success message to the PDS, and after the PDS forwards the updating success message to the user terminal through the BSS, the user terminal displaying the updating success message.

According to the method and system for querying group's dispatching area information disclosed by the embodiments of the present invention, a user terminal can obtain the needed group's dispatching area information in real time through a request for querying the group's dispatching area information. Since the group's dispatching area information can be queried in real time, it is not necessary to query on a dispatching management platform, and it is possible to know that the group member is outside the dispatching area before finding a call is missed or a call is unable to be initiated to the group number. Therefore, the present invention can improve the validity, the dispatching reliability and accuracy of the group call. In addition, it is not unnecessary for a user to memorize the number for a specific function group. Therefore, the method and system provided by the embodiments of the present invention have the advantages of easy operation and high accessibility, and can better meet user requirements.

DETAILED DESCRIPTION OF THE EMBODIMENTS

The basic idea of the present invention is that a user terminal can obtain group's dispatching area information by means of a request for querying group's dispatching area information.

The present invention mainly comprises two parts: activating/disabling the function for querying group's dispatching area information and querying the group's dispatching area information. A user can only query group's dispatching area information after activating the function for querying group's dispatching area information. Further, when the user does not need to query the group's dispatching area information, the user may choose to disable the function for querying group's dispatching area information. The process of activating and disabling the function for querying group's dispatching area information are similar.

In the embodiments of the present invention, a user terminal sends a request for querying group's dispatching area information to the base station; and the base station queries for the group's dispatching area information according to the request for querying group's dispatching area information and returns the response to group's dispatching area information query to the user terminal.

Figure 2:
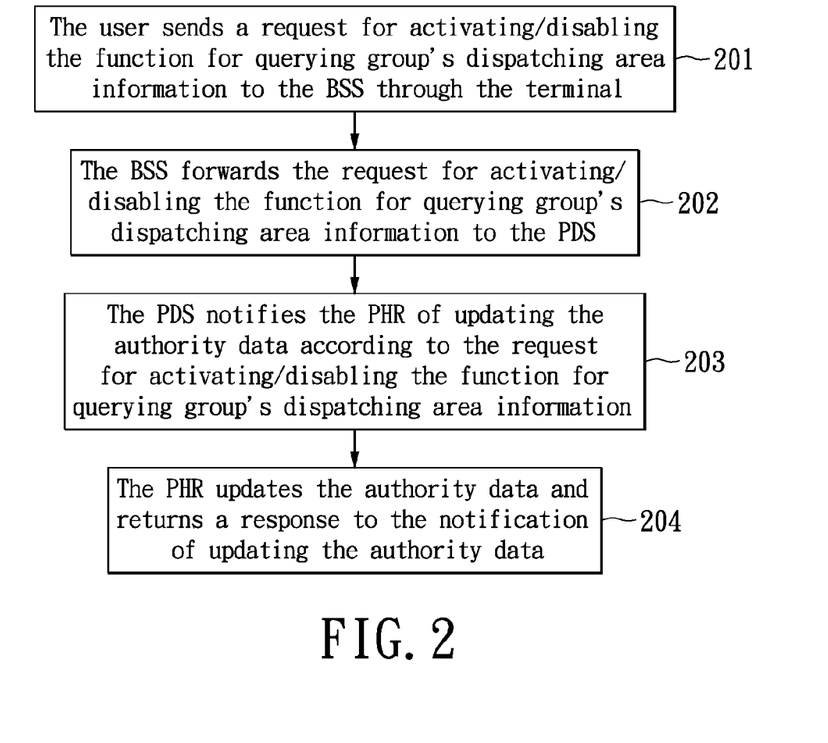
FIG. 2 shows a flowchart of a method for activating/disabling the function for querying group's dispatching area information according to the embodiments of the present invention.

FIG. 2 shows a flowchart of a method for activating/disabling the function for querying group's dispatching area information; and as shown in the FIG. 2, the method for activating/disabling the function for querying group's dispatching area information according to the embodiments of the present invention comprises the following steps:

Step 201, the user sends a request for activating/disabling the function for querying group's dispatching area information to the BSS through the user terminal In this step, the user may choose to activate/disable the function for querying group's dispatching area information through a menu at the user terminal, which will trigger the user terminal to initiate a call to the BSS via the activating code/disabling code bound with the user terminal.

Step 202: the BSS forwards the request of activating/disabling the function for querying group's dispatching area information to the PDS.

In this step, after receiving the request of activating/disabling the function for querying group's dispatching area information from the user terminal, the BSS determines that the service is a Push-To-Talk (PTT) service. Then a Dispatching Client (PDC) therein sets up a signalling channel with the PDS and the request for activating/disabling the function for querying group's dispatching area information is forwarded to the PDS through the channel.

Step 203, the PDS notifies the PHR of updating the authority data according to the request for activating/disabling the function for querying group's dispatching area information.

Step 204, the PHR updates the authority data and returns a response to the notification of updating the authority data.

Preferably, the PHR firstly authenticates whether the user is a legitimate user according to the relevant information stored on it, and then updates the authority data after the user is authenticated as a legitimate user.

The PHR updates the authority data and returns the response to the notification of updating authority data as follows: if the content requested by the user is consistent with the authority data stored on the PHR (e.g., if the user requests to activate the function for querying group's dispatching area information, and the function stored in the PHR for querying group's dispatching area information associated with the user is in the activated state), the PHR returns operation-complete information to the PDS. After the PDS forwards the information to the user terminal through the BSS, the user terminal displays the operation-complete information. If the content requested by the user is inconsistent with the authority data stored on the PHR (e.g. if the user requests to activate the function for querying group's dispatching area information, and the function stored in the PHR for querying group's dispatching area information associated with the user is in an off state), the PHR updates the corresponding authority data according to the user request (e.g. the off state of the function for querying group's dispatching area information of the user is changed into the activated state), and returns activated/disabled success message to the PDS. After the PDS forwards the activated/disabled success message to the user terminal through the BSS, the user terminal displays the activated/disabled success information.

Figure 3:
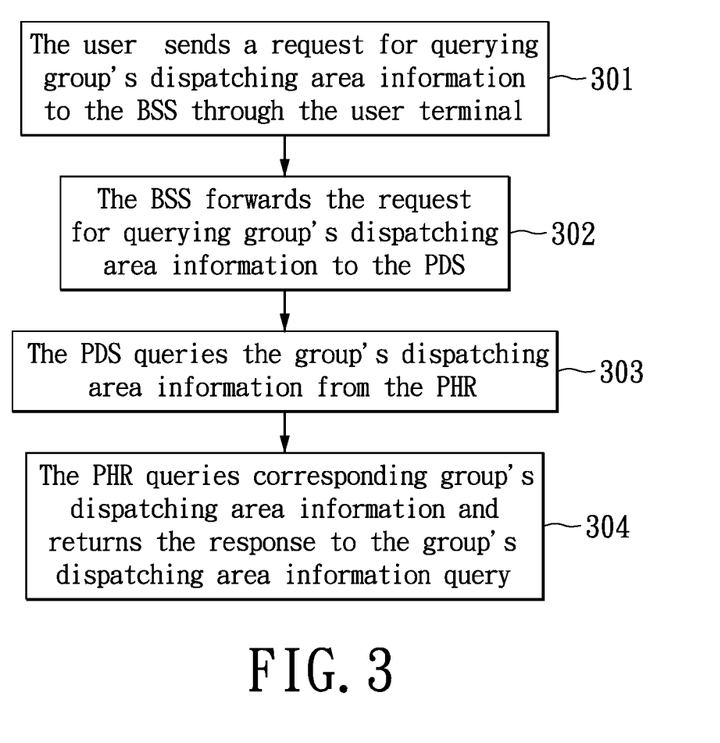
FIG. 3 shows a flowchart of a method for querying a group's dispatching area information according to the embodiments of the present invention.

FIG. 3 shows a flowchart of a method for querying group's dispatching area information according to the present invention. As shown in FIG. 3, the method for querying the group's dispatching area information according to the present invention comprises the following steps:

Step 301, the user sends a request for querying group's dispatching area information to the BSS through the user terminal.

In this step, the user can edit the group number and initiates the query through a menu on the user terminal, which will trigger the user terminal to initiate a call via a query code bound with the user terminal.

Step 302, the BSS forwards the request for querying group's dispatching area information to the PDS.

In this step, after receiving the request for querying group's dispatching area information, the BSS determines that the service is a PTT service, and then the PDC therein forwards the request for querying group's dispatching area information.

Step 303, the PDS queries the group's dispatching area information from the PHR.

Step 304, the PHR queries corresponding group's dispatching area information and returns the response to the group's dispatching area information query.

Preferably, the PHR firstly authenticates whether the user is a legitimate user according to the relevant information stored on it, and after the authentication is successful, the PHR then queries corresponding group's dispatching area information.

The PHR queries corresponding group's dispatching area information and returns the response to the group's dispatching area information query as follows: the PHR determines whether the user has query authority according to the authority data stored on it; if the user has the query authority (corresponding authority data of the user is in the activated state), the PHR calls out the group's dispatching area information requested by the user and returns the information to the PDS, and after the PDS forwards the information to the user terminal through the BSS, the user terminal displays the query result; and if the user has no query authority (corresponding authority data of the user is in the off state), the PHR returns a message to the PDS indicating that the function for querying the group's dispatching area information is not activated, and after the PDS forwards the message to the user terminal through the BSS, the message that the function for querying the group's dispatching area information is not activated will be displayed on the user terminal.

Generally, after receiving the response to the group dispatching area information query from the PHR, the PDS will send an updating command to the BSS. The BSS then informs the user terminal of preparing for receiving the dispatching area information, and the user terminal sends a handshake message to the PDS to respond to the updating command. The PDS then obtains the group's dispatching area information from the PHR and sends the updating command to the user terminal, and the user terminal analyzes the updating command and displays corresponding information.

The present invention also provides a system for querying group's dispatching area information, the system comprising a user terminal and a base station, wherein the user terminal is configured to send a request for querying group's dispatching area information to the base station according to the user operation; and the base station is configured to query the group's dispatching area information according to the request for querying group's dispatching area information from the user terminal, and return a response to the group's dispatching area information query to the user terminal.

The base station specifically comprises BSS, PDS and PHR, wherein the BSS is configured to receive a request for querying group's dispatching area information from the user terminal and forward the request to the PDS;

the PDS is configured to query the group dispatching area information from the PHR according to the request for querying group's dispatching area information forwarded by the BSS; and the PHR is configured to query corresponding group's dispatching area information according to the query of the PDS and return the response to the group's dispatching area information query to the user terminal.

The PHR is also configured to authenticate whether the user is a legitimate user according to the relevant information stored on it, and after the authentication is successful, query corresponding group's dispatching area information.

The PHR queries corresponding group's dispatching area information and returns the response to the group's dispatching area information query to the user terminal as follows:

the PHR determines whether the user has a query authority according to the authority data stored on it. If the user has the query authority, the PHR calls out the group's dispatching area information requested by the user and returns the information to the PDS. After the PDS forwards the group's dispatching area information to the user terminal through the BSS, the user terminal displays the query result. If the user has no query authority, the PHR returns a message to the PDS indicating that the function for querying group's dispatching area information is not activated, and after the PDS forwards the message to the user terminal through the BSS, the message that the function for querying group's dispatching area information is not activated is displayed on the user terminal.

The user terminal is further configured to send a request for activating the function for querying group's dispatching area information to the BSS according to the user operation;

the BSS is further configured to forward the request for activating the function for querying group's dispatching area information from the user terminal to the PDS;

the PDS is further configured to notify the PHR of updating the authority data when receiving the request of activating the function for querying group's dispatching area information from the BSS; and the PHR is further configured to update the authority data of the user after receiving the notification from the PDS and return the response to the notification of updating authority data.

The user terminal is further configured to send a request for disabling the function for querying group's dispatching area information to the BSS according to the user operation;

the BSS is further configured to forward the request for disabling the function for querying group's dispatching area information from the user terminal to the PDS;

the PDS is further configured to notify the PHR of updating the authority data when receiving the request of disabling the function for querying group's dispatching area information from the BSS; and the PHR is further configured to update the authority data after receiving the notification from the PDS and return the response to the notification of updating the authority data.

The PHR updates the authority data and returns the response to the notification of updating authority data as follows:

If the content requested by the user is consistent with the authority data stored in the PHR, the PHR returns the operation-complete information to the PDS, and after the PDS forwards the information to the user terminal through the BSS, the information will be displayed on the user terminal. If the content requested by the user is inconsistent with the authority data stored on the PHR, the PHR updates the corresponding authority data according to the user request and returns updating success message to the PDS, and after the PDS forwards the information to the terminal through the BSS, the user terminal displays the information.

The implementation of the technical solution of the present invention is further described in detail with reference to following specific the embodiments.

Embodiment 1

Figure 4:
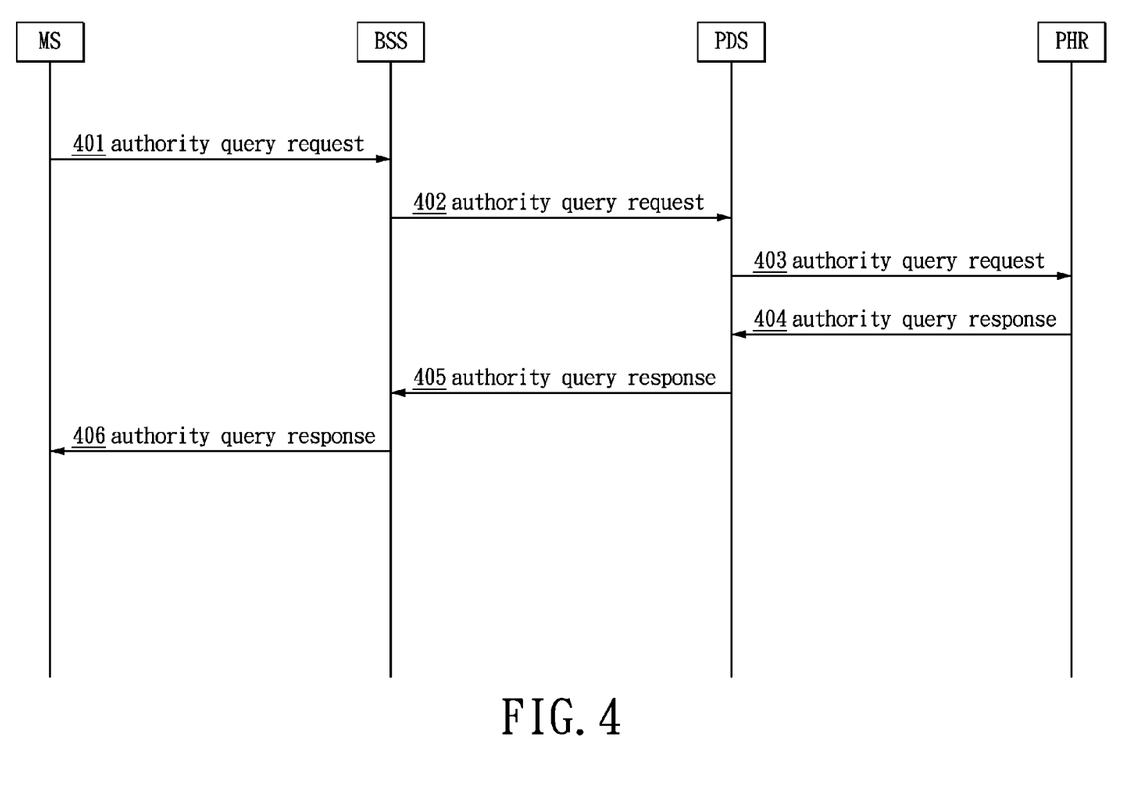
FIG. 4 shows a flowchart that a user terminal queries authority data for querying group's dispatching area information disclosed in embodiment 1 of the disclosure.

In this embodiment, the system supports the group's dispatching area information query, and the user terminal queries its authority for a dispatching area. FIG. 4 shows a flowchart that a user terminal queries its authority for a dispatching area according to example embodiment 1 of the present invention; and as shown in FIG. 4, the user terminal queries its authority for the dispatching area according to embodiment 1 as follows:

Step 401, the user terminal sends an authority query request to the BSS.

Step 402, the BSS forwards the authority query request to the PDS.

Step 403, the PDS sends an authority query request to the PHR.

Step 404, after determining that the user is a legitimate user, the PHR returns a response to the authority query request to the PDS.

Step 405, the PDS sends the response to the authority query request to the BSS.

Step 406, the BSS sends the response to the authority query request to the user terminal and the user terminal displays the response to the user.

Embodiment 2

Figure 5:
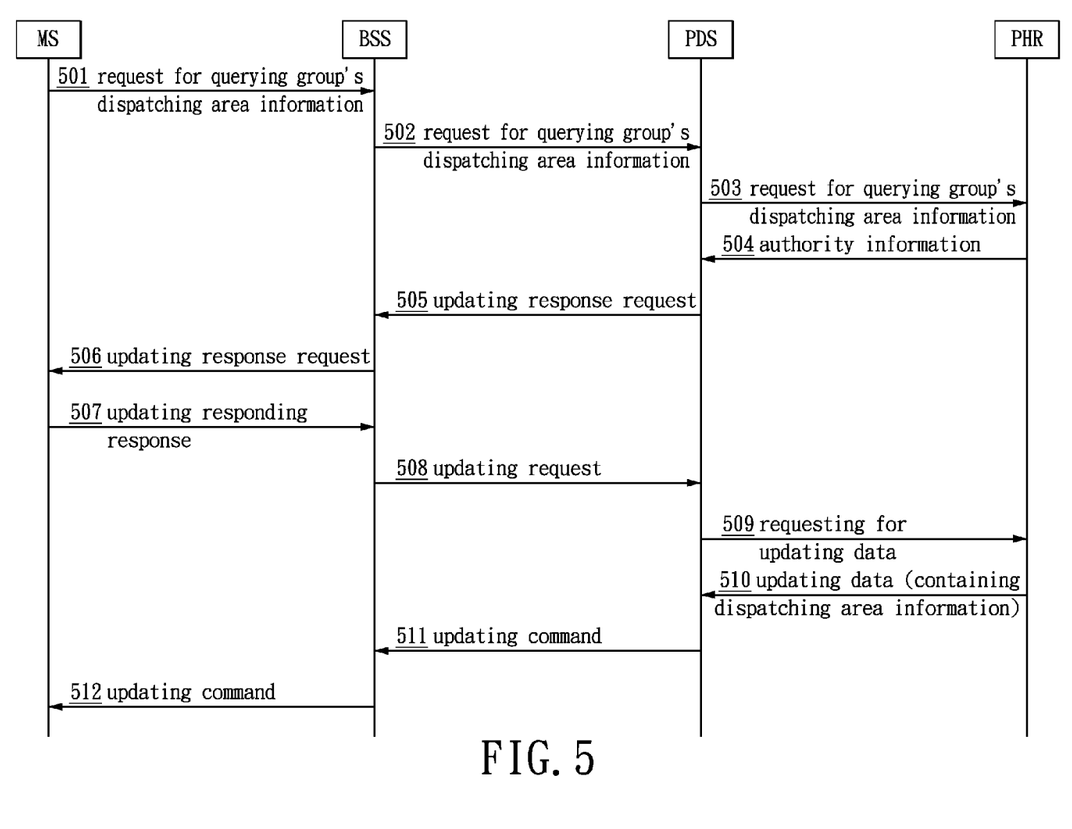
FIG. 5 shows a flowchart that a user terminal queries a group's dispatching area information in embodiment 2 of the disclosure.

In this embodiment, the system supports group's dispatching area information query, and the user terminal succeeds in querying the group dispatching area information. FIG. 5 shows a flowchart that a user terminal queries dispatching area information according to the embodiments of the present invention; and as shown in FIG. 5, the user terminal queries the group's dispatching area information according to example embodiment 2 of the present invention as follows:

Step 501, the terminal sends a request for querying group's dispatching area information to the BSS.

The request for querying group's dispatching area information contains a number of a group to be queried.

Step 502, the BSS forwards the request for querying group's dispatching area information to the PDS.

Step 503, the PDS sends the request for querying group's dispatching area information to the PHR.

Step 504, after determining that the user is a legitimate user, the PHR determines that the user has the authority for querying group's dispatching area information and returns the authority information to the PDS.

Step 505, the PDS sends an updating response request to the BSS according to the authority information returned by the PHR.

Step 506, the BSS sends the updating response request to the user terminal.

Step 507, the user terminal responds to the updating response request and displays "be in connection".

Step 508, the BSS forwards the updating request from the user terminal to the PDS.

Step 509, the PDS responds to the updating request and requests the PHR for updating the data.

Step 510, the PHR returns the updated data to the PDS.

Step 511, the PDS sends an updating command to the BSS.

Step 512, the BSS forwards the updating command to the user terminal.

Step 513, the user terminal obtains the group's dispatching area information and displays the information.

Embodiment 3

Figure 6:
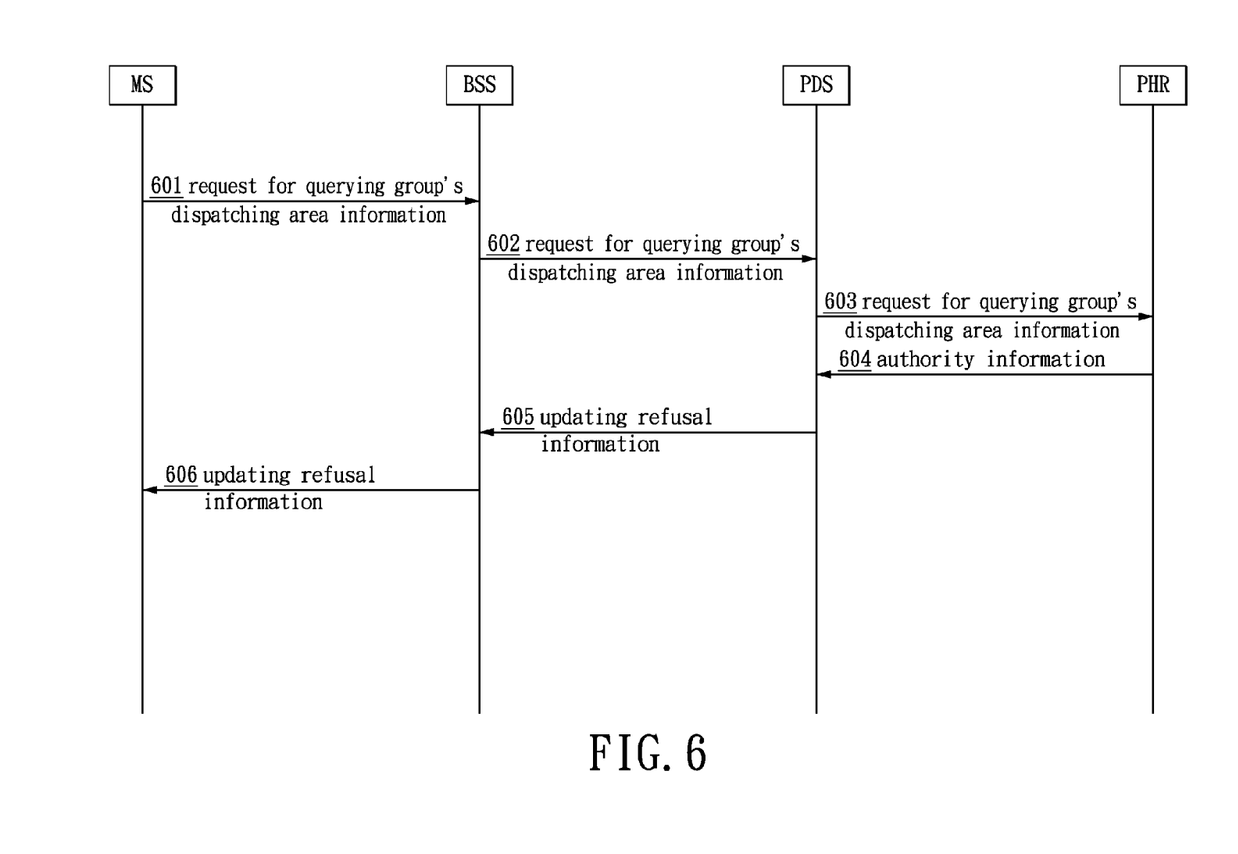
FIG. 6 shows a flowchart that a user terminal queries group dispatching area information in embodiment 3 of the disclosure.

In this embodiment, the system supports the group dispatching area query; a user terminal, the query service of which is not activated, queries the group's dispatching area information. FIG. 6 shows a flowchart that the user terminal queries group's dispatching area information according to embodiment 3 of the present invention; and as shown in FIG. 6, the user terminal queries the group's dispatching area information as follows:

Step 601, the user terminal sends a request for querying group's dispatching area information to the BSS.

The request for querying group's dispatching area information carries a number of a group to be queried.

Step 602, the BSS forwards the request for querying group's dispatching area information to the PDS.

Step 603, the PDS sends the request for querying group's dispatching area information to the PHR.

Step 604, after determining that the user is a legitimate user, the PHR determines that the terminal has no authority for querying group's dispatching area information and returns the authority information to the PDS.

Step 605, the PDS sends updating refusal information to the BSS according to the authority information returned by the PHR.

Step 606, the BSS forwards the updating refusal information to the user terminal; and the user terminal displays "service inactivated".

The above is only the preferred embodiment of the disclosure and not intended to limit the scope of protection of the disclosure.

What is claimed is:

1. A method for querying group's dispatching area information, comprising:
  sending, by a user, a request for querying a group's dispatching area information to a base station through a user terminal;
  querying, by the base station, the group's dispatching area information according to the request for querying the group's dispatching area information; and
  returning a response to the group's dispatching area information query to the user terminal,
  wherein the step of sending, by the user, the request for querying the group's dispatching area information to the base station through the user terminal comprises: sending, by the user, the request for querying the group's dispatching area information to the Base Station Subsystem (BSS) through the user terminal; and
  the step of querying, by the base station, the group's dispatching area information according to the request for querying the group's dispatching area information; and returning a response to the group's dispatching area information query to the user terminal comprises:
    forwarding, by the BSS, the request for querying the group's dispatching area information to a Dispatching Server (PDS);
    querying, by the PDS, the group's dispatching area information from a Home Location Register (PHR);
    querying, by the PHR, corresponding group's dispatching area information; and
    returning a response to the group's dispatching area information query to the user terminal, wherein the step of querying, by the PHR, corresponding group's dispatching area information and returning the response to the group's dispatching area information query to the user terminal comprises:

determining, by the PHR, whether the user has the query authority according to authority data stored on the PHR; if the user has the query authority, calling out, by the PHR, the group's dispatching area information requested by the user and returning the group's dispatching area information to the PDS; and after the PDS forwarding the group's dispatching area information to the user terminal through the BSS, displaying, by the user terminal, a query result; and if the user has no query authority, returning a message, by the PHR, to the PDS indicating that a function for querying group's dispatching area information is not activated, after the PDS forwarding the group's dispatching area message to the user terminal through the BSS, displaying, by the user terminal, that the function for querying group's dispatching area information is not activated.

2. The method according to claim 1, wherein
before the step of querying, by the PHR, corresponding group's dispatching area information, the method further comprises:
authenticating, by the PHR, whether the user is a legitimate user according to relevant information stored on the PHR; and
querying corresponding group's dispatching area information after the authentication is successful.

3. The method according to claim 1, further comprising:
activating the function for querying group's dispatching area information, comprising:
  sending, by the user, a request for activating the function for querying group's dispatching area information to the BSS through the user terminal;
  forwarding, by the BSS, the request for activating the function for querying group's dispatching area information to the PDS;
  notifying, by the PDS, the PHR of updating authority data according to the request for activating the function for querying group's dispatching area information; and
  updating, by the PHR, the authority data and returning a response to the notification of updating the authority data.

4. The method according to claim 1, further comprising:
disabling the function for querying group's dispatching area information, comprising:
  sending, by the user, a request for disabling a function for querying group's dispatching area information to the BSS through the user terminal;
  forwarding, by the BSS, the request for disabling the function for querying group's dispatching area information to the PDS;
  notifying, by the PDS, the PHR of updating the authority data according to the request of disabling the function for querying group's dispatching area information; and
  updating, by the PHR, the authority data and returning the response to notification of updating the authority data.

5. The method according to claim 3, wherein the step of updating, by the PHR, the authority data and returning the response to the notification of updating the authority data comprises:
  returning, by the PHR, operate-complete information to the PDS if content requested by the user is consistent with the authority data stored on the PHR, and after the PDS forwarding the operate-complete information to the user terminal through the BSS, displaying, by the user terminal, the operation-complete information; and
  if the content requested by the user is inconsistent with the authority data stored on the PHR, updating, by the PHR, the corresponding authority data according to the user request and returning updating success message to the PDS, and after the PDS forwarding the updating success message to the user terminal through the BSS, displaying, by the user terminal, the updating success message.

6. A system for querying group's dispatching area information, comprising a user terminal and a base station, wherein
  the user terminal is configured to send a request for querying group's dispatching area information to the base station according to a user operation; and
  the base station is configured to query the group's dispatching area information according to the request for querying group's dispatching area information from the user terminal, and return a response to the group's dispatching area information query to the user terminal,
  wherein the base station comprises a Base Station Subsystem (BSS), a Dispatching Server (PDS) and a Home Location Register (PHR), wherein
  the BSS is configured to receive the request for querying group's dispatching area information from the user terminal and forward the request for querying group's dispatching area information to the PDS;
  the PDS is configured to query the group's dispatching area information from the PHR according to the request for querying group's dispatching area information forwarded by the BSS; and
  the PHR is configured to query corresponding group's dispatching area information according to the query of the PDS and return the response to the group's dispatching area information to the user terminal,
  wherein the step of querying, by the PHR, corresponding group's dispatching area information and returning the response to the group's dispatching area information query to the user terminal comprises:
  the PHR determining whether the user has a query authority according to the authority data stored on the PHR; if the user has the query authority, the PHR calling out the group's dispatching area information requested by the user and returns the information to the PDS, and after the PDS forwards the information to the user terminal through the BSS, the user terminal displaying a query result; and if the user has no query authority, the PHR returning a message to the PDS indicating that a function for querying group's dispatching area information is not activated, and after the PDS forwards the message to the user terminal through the BSS, the user terminal displaying that the function for querying group's dispatching area information is not activated.

7. The system according to claim 6, wherein
the PHR is further configured to authenticate whether the user is a legitimate user according to the relevant information stored on the PHR, and if the authentication is successful, the PHR queries corresponding group's dispatching area information.

8. The system according to claim 6, wherein
the terminal is further configured to send a request for activating the function for querying group's dispatching area information to the BSS according to the user operation;

the BSS is further configured to forward the request for activating the function for querying group's dispatching area information from the user terminal to the PDS;

the PDS is further configured to notify the PHR of updating the authority data when receiving the request for activating the function for querying group's dispatching area information from the BSS; and the PHR is further configured to update the authority data after receiving the notification of updating authority data from the PDS and return a response to the notification of updating authority data.

9. A system according to claim 6, wherein the user terminal is further configured to send a request of disabling the function for querying group's dispatching area information to the BSS according to the user operation;

the BSS is further configured to forward the request of disabling the function for querying group's dispatching area information from the user terminal to the PDS;

the PDS is further configured to notify the PHR of updating the authority data when receiving the request for disabling the function for querying group's dispatching area information from the BSS; and the PHR is further configured to update the authority data after receiving the notification of updating the authority data from the PDS and return a response to the notification of updating the authority data.

10. A system according to claim 8, wherein the step of the PHR updating the authority data and returning the response to the notification of updating authority data comprises:

if content requested by the user is consistent with the authority data stored in the PHR, the PHR returning the operation-complete information to the PDS, and after the PDS forwards the information to the user terminal through the BSS, the user terminal displaying the operation-complete information; and if the content requested by the user is inconsistent with the authority data stored on the PHR, the PHR updating the corresponding authority data according to the user request and returning updating success message to the PDS, and after the PDS forwards the updating success message to the user terminal through the BSS, the user terminal displaying the updating success message.

11. The method according to claim 4, wherein the step of updating, by the PHR, the authority data and returning the response to the notification of updating the authority data comprises:

returning, by the PHR, operate-complete information to the PDS if content requested by the user is consistent with the authority data stored on the PHR, and after the PDS forwarding the operate-complete information to the user terminal through the BSS, displaying, by the user terminal, the operation-complete information; and if the content requested by the user is inconsistent with the authority data stored on the PHR, updating, by the PHR, the corresponding authority data according to the user request and returning updating success message to the PDS, and after the PDS forwarding the updating success message to the user terminal through the BSS, displaying, by the user terminal, the updating success message.

12. A system according to claim 9, wherein the step of the PHR updating the authority data and returning the response to the notification of updating authority data comprises:

if content requested by the user is consistent with the authority data stored in the PHR, the PHR returning the operation-complete information to the PDS, and after the PDS forwards the information to the user terminal through the BSS, the user terminal displaying the operation-complete information; and if the content requested by the user is inconsistent with the authority data stored on the PHR, the PHR updating the corresponding authority data according to the user request and returning updating success message to the PDS, and after the PDS forwards the updating success message to the user terminal through the BSS, the user terminal displaying the updating success message.

* * * * *